(12) United States Patent
Crawford

(10) Patent No.: US 10,428,764 B2
(45) Date of Patent: Oct. 1, 2019

(54) DEFLECTION LIMITER FOR A CASCADE ASSEMBLY OF A THRUST REVERSER

(71) Applicant: ROHR, INC., Chula Vista, CA (US)

(72) Inventor: Sara Christine Crawford, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 500 days.

(21) Appl. No.: 15/040,274

(22) Filed: Feb. 10, 2016

(65) Prior Publication Data

US 2017/0226962 A1 Aug. 10, 2017

(51) Int. Cl.
*F02K 1/72* (2006.01)
*F01D 25/24* (2006.01)
*F01D 25/28* (2006.01)
*F02K 1/76* (2006.01)
*F04D 29/52* (2006.01)

(52) U.S. Cl.
CPC ............... *F02K 1/72* (2013.01); *F01D 25/24* (2013.01); *F01D 25/28* (2013.01); *F02K 1/766* (2013.01); *F04D 29/522* (2013.01); *F05D 2220/323* (2013.01)

(58) Field of Classification Search
CPC . F02K 1/72; F02K 1/625; F02K 1/766; F02K 1/763; F05D 2240/129
See application file for complete search history.

(56) References Cited

U.S. PATENT DOCUMENTS 8,899,013 B2 12/2014 Hurlin et al.
9,677,502 B2 * 6/2017 Caruel ................... B64D 29/08

2013/0075492 A1 * 3/2013 Welch ........................ F02K 3/02
239/265.19
2014/0325957 A1 11/2014 Aten
2015/0260126 A1 9/2015 Caruel

FOREIGN PATENT DOCUMENTS

FR 3007800 A1 1/2015
WO 9634193 A1 10/1996
WO WO2012010774 * 1/2012 ............... F02K 1/72
WO 2012010774 A2 1/2017

OTHER PUBLICATIONS

Extended European Search Report for application No. 17155710.1-1607 dated Jun. 12, 2017, 7 pages.

* cited by examiner

*Primary Examiner* — Andrew H Nguyen
(74) *Attorney, Agent, or Firm* — Cantor Colburn LLP

(57) ABSTRACT

A cascade assembly of a nacelle for a turbofan engine includes a cascade concentrically disposed about an centerline, and a translating sleeve constructed and arranged to move between a forward position and an aft position along the centerline. A deflection limiter of the cascade assembly includes a first surface facing at least in-part in a radial direction and a second surface facing at least in-part in an opposite radial direction. The first surface is carried by one of the cascade and the translating sleeve and the second surface is carried by the other of the cascade and the translating sleeve. The first and second surfaces oppose one-another for limiting deflection when the translating sleeve is in the aft position and are spaced axially apart when the translating sleeve is in the forward position.

9 Claims, 8 Drawing Sheets

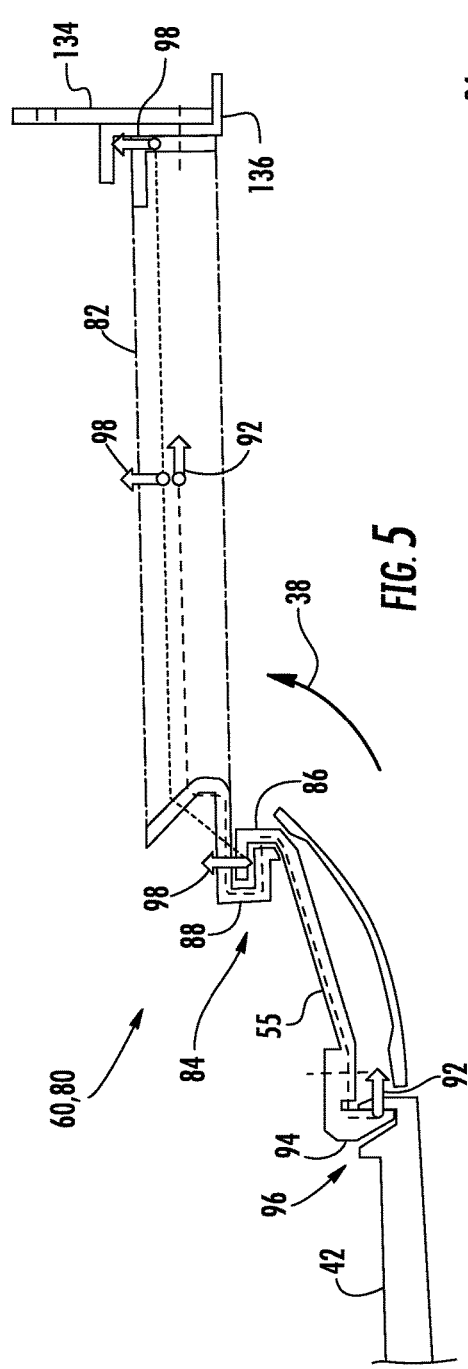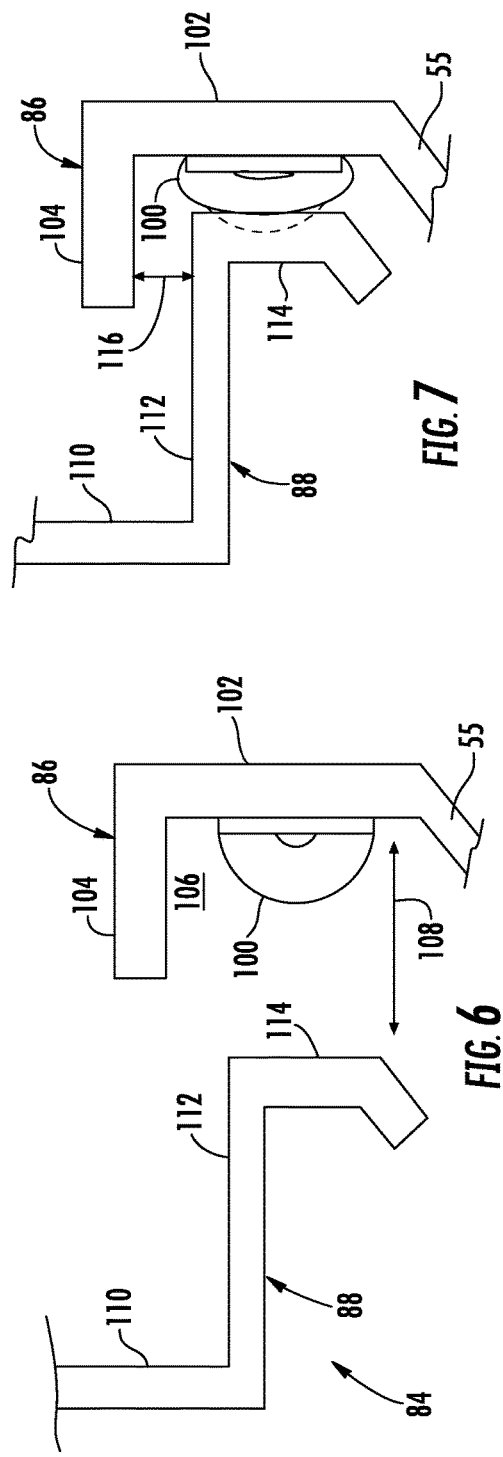

DEFLECTION LIMITER FOR A CASCADE ASSEMBLY OF A THRUST REVERSER

BACKGROUND

The present disclosure relates to a thrust reverser of an aircraft nacelle, and more particularly, to a deflection limiter of a cascade assembly of the thrust reverser.

Jet powered aircraft employ thrust reversers to reduce aircraft speed during landing. Thrust reversers generally expel fan bypass airflow in a forward direction to create reverse thrust. The thrust reversers typically employ cascades to direct the exhausted fan bypass airflow. In some thrust reverser designs, the array of cascades may translate rearward from a stowed position to a deployed position. In such thrust reverser designs, there is a need for effective load paths to react loads on the cascade array and for deflection limiters to limit deflections.

SUMMARY

A cascade assembly of a nacelle for a turbofan engine according to one, non-limiting, embodiment of the present disclosure includes a cascade concentrically disposed about an centerline; a translating sleeve constructed and arranged to move between a forward position and an aft position along the centerline; and a deflection limiter including a first surface facing at least in-part in a radial direction and carried by one of the cascade and the translating sleeve and a second surface facing at least in-part in an opposite radial direction and carried by the other of the cascade and the translating sleeve, and wherein the first and second surfaces oppose one-another for limiting deflection when the translating sleeve is in the aft position and are spaced axially apart when the translating sleeve is in the forward position.

Additionally to the foregoing embodiment, the cascade is a translating cascade constructed and arranged to move between a stowed state and a deployed state along the centerline, and wherein the deflection limiter is mated for transferring load when the translating sleeve is in the aft position and the translating cascade is in the deployed state, and is un-mated when the translating sleeve is in the forward position and the translating cascade is in the stowed state.

In the alternative or additionally thereto, in the foregoing embodiment, the translating cascade is a one-piece cascade.

In the alternative or additionally thereto, in the foregoing embodiment, the first surface is carried by a first catch of the deflection limiter fixed to the translating sleeve and the second surface is carried by a second catch of the deflection limiter fixed to the cascade, and wherein the first and second catches are constructed and arranged to mate when the translating sleeve is in the aft position and is un-mated when the translating sleeve is in the forward position.

In the alternative or additionally thereto, in the foregoing embodiment, the cascade includes a forward portion and an aft portion located axially rearward of the forward portion and the second catch is fixed to the aft portion.

In the alternative or additionally thereto, in the foregoing embodiment, the cascade assembly includes a fixed structure; a hook device including a third catch fixed to the fixed structure and a fourth catch fixed to a forward portion of the cascade, and wherein the third catch is mated to the fourth catch for translating load when the translating cascade is in the deployed state and the translating sleeve is in the aft position; and wherein the second surface is carried by an aft portion of the cascade disposed axially rearward of the forward portion.

In the alternative or additionally thereto, in the foregoing embodiment, the aft portion is a cascade hoop.

In the alternative or additionally thereto, in the foregoing embodiment, the fixed structure includes a fan case.

In the alternative or additionally thereto, in the foregoing embodiment, the first catch is axially spaced forward of the second catch when the translating sleeve is in the forward position, and wherein during deployment the first catch is mated to the second catch when the translating sleeve is moving from the mid position to the aft position.

In the alternative or additionally thereto, in the foregoing embodiment, the first catch includes a first portion projecting radially inward from the translating sleeve and at least one pin-like second portion projecting axially rearward from the first portion, and wherein the second catch includes a first segment projecting radially outward from the aft portion of the translating cascade and defining a hole for receipt of the pin-like second portion when the deflection limiter is mated.

In the alternative or additionally thereto, in the foregoing embodiment, first catch includes a first portion projecting radially inward from the translating sleeve and an enlarged head engaged to a distal end of the first portion, and wherein the second catch includes a first segment projecting radially outward from the aft portion of the translating cascade and a second segment projecting axially forward from the first segment and spaced radially outward from the translating cascade, the second segment defining a slot opened in a forward direction for receipt of the first portion when the deflection limiter is mated.

In the alternative or additionally thereto, in the foregoing embodiment, the first catch includes a first portion projecting radially inward from the translating sleeve and a second portion projecting axially rearward and the second catch defines a circumferentially extending groove opened axially forward for receipt of the second portion when the deflection limiter is mated.

In the alternative or additionally thereto, in the foregoing embodiment, the first catch and the groove are generally circumferentially continuous.

In the alternative or additionally thereto, in the foregoing embodiment, the third catch includes a first portion projecting radially outward from the fixed structure and a second portion projecting axially forward from the first portion, the first and second portions defining at least in-part a channel, and wherein the fourth catch includes a first segment projecting radially inward from the one-piece cascade and a second segment projecting axially aft of the first segment such that the second segment is disposed in the channel when the translating cascade is in the deployed state.

In the alternative or additionally thereto, in the foregoing embodiment, the fixed structure includes a shear web projecting at least in-part axially rearward from the fan case and the first portion of the third catch is attached to the shear web.

In the alternative or additionally thereto, in the foregoing embodiment, the fixed structure includes a shear web projecting at least in-part axially rearward from the fan case and the third catch is attached to the shear web.

A method of operating a thrust reverser according to another, non-limiting, embodiment includes moving a translating sleeve rearward from a forward position and toward a mid-position with a cascade assembly is in a stowed state; contacting a first surface carried by the translating sleeve to a second surface carried by the cascade assembly when the translating sleeve is in the mid position; and moving the translating sleeve and the cascade assembly rearward until the translating sleeve is in the aft position and the cascade assembly is in the stowed state.

Additionally to the foregoing embodiment, the first surface is part of a first catch attached to the translating sleeve and the second surface is part of a second catch attached to the cascade assembly.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 5 is a partial cross section of a cascade assembly of the thrust reverser in the deployed state;

FIG. 6 is a partial cross section of a forward hook device of the cascade assembly in a partially deployed state;

FIG. 7 is a partial cross section of the forward hook device in a partially loaded deployed state;

DETAILED DESCRIPTION

Figure 1:
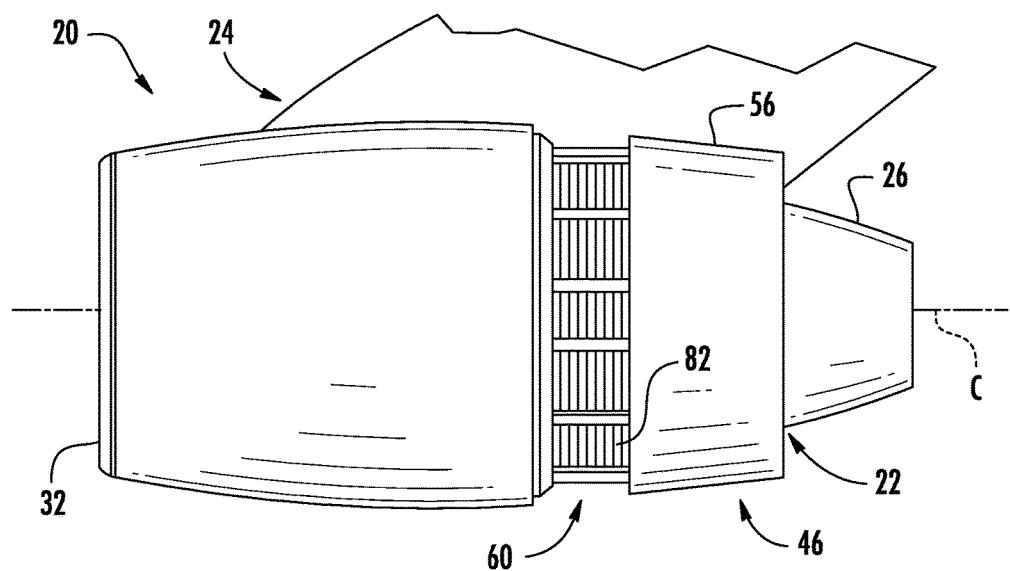
FIG. 1 is a side view of a turbofan engine as one, non-limiting, application of the present disclosure.
Figure 2:
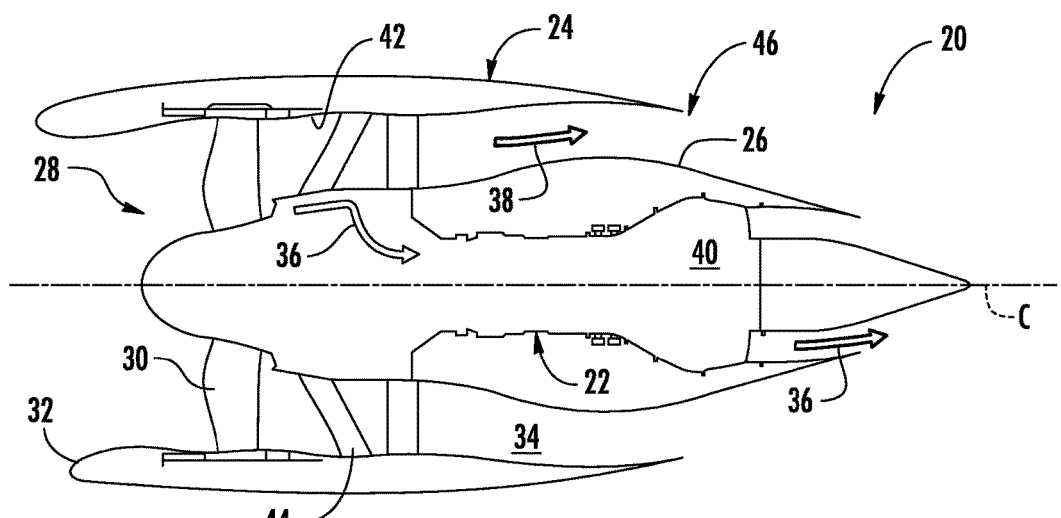
FIG. 2 is a diagrammatic cross section of the turbofan engine.

Referring to FIGS. 1 and 2, a turbofan engine 20 includes an engine core 22 and an aircraft nacelle 24. The engine core 22 may be housed, at least in-part, in a core cowl 26. A fan section 28 may be mounted adjacent to an upstream end of the nacelle 24, and may include a series of fan blades 30 that rotate about an engine centerline C during engine operation so as to draw a flow of air into an inlet end 32 of the turbofan engine 20. The airflow drawn into the engine 20 is accelerated by the rotating fan blades 30, and is generally divided into a core airflow (see arrow 36 in FIG. 2) and a bypass airflow (see arrow 38). The core airflow is directed into and through a multi-stage compressor section (not shown) within the engine core 22. The core airflow is initially passed through the compressor section to increase the airflow pressure, and then the pressurized core airflow is passed through a combustor section (not shown), where the air is mixed with fuel and the mixture ignited. The combustion of the fuel-and-air mixture within the combustor section causes the air to expand, which in-turn drives a series of turbine stages of a turbine section 40 located toward the rear of the engine 20, to rotate and in-turn provide power to the fan section 28. As a heated exhaust gas, the core airflow 36 is then directed out of the rear of the engine core 22 downstream from the turbine section 40.

The bypass airflow 38 generally flows through a bypass flowpath or duct 34 located downstream of the fan blades 30. The bypass duct 34 may be annular and may include boundaries defined radially between the core cowl 26 and, at least in part, a fixed structure 42 that may include a fan case of the fan section 28. The bypass airflow 38 is accelerated by the rotating fan blades 30, passes through a plurality of outer guide vanes (OGVs) 44, through the bypass duct 34, and out through a fan nozzle assembly 46. The fan section 28 may produce a substantial portion of the engine thrust.

Figure 3:
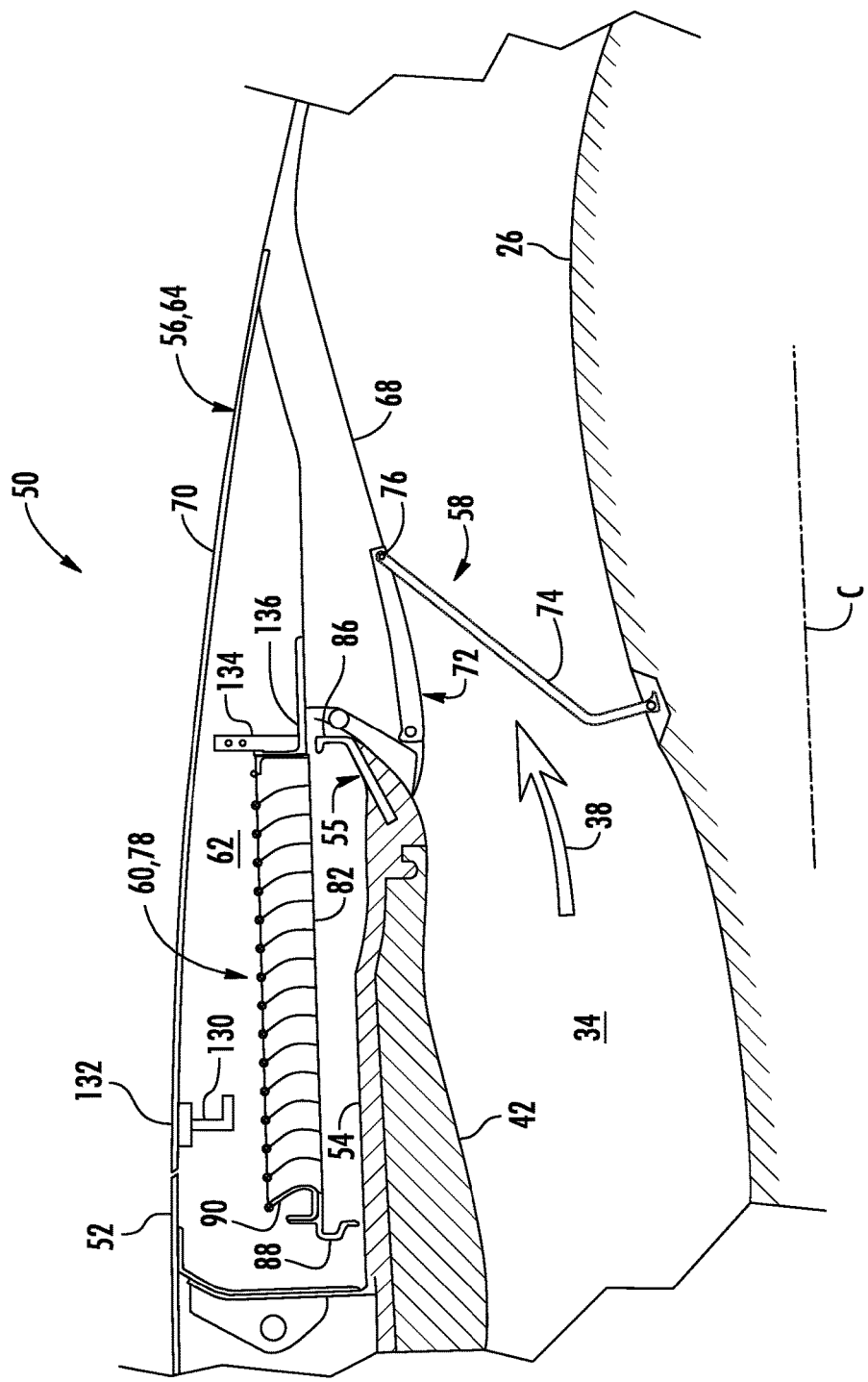
FIG. 3 is a partial cross section of a thrust reverser of the turbofan engine in a stowed state.
Figure 4:
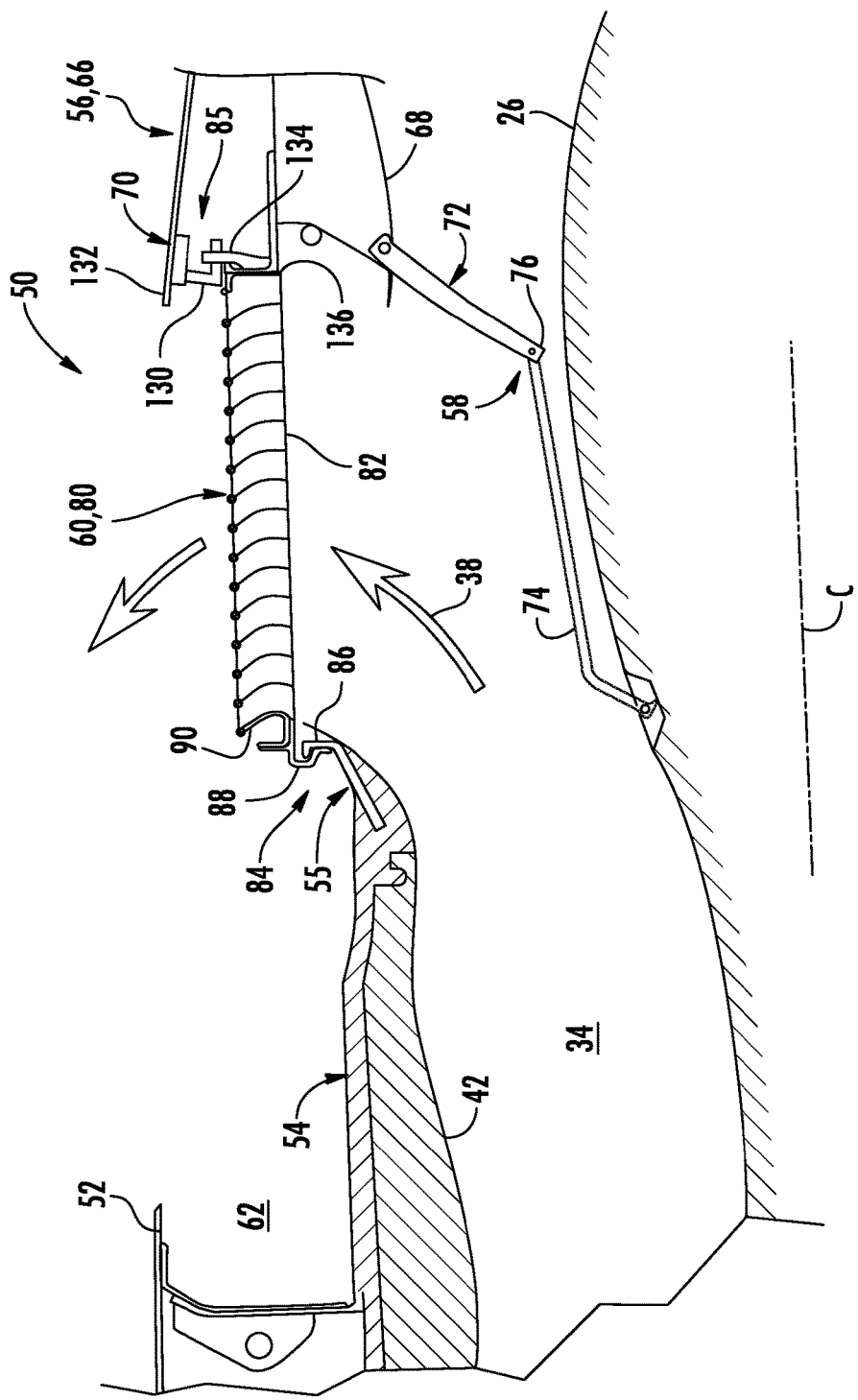
FIG. 4 is a partial cross section of the thrust reverser in a deployed state.

Referring to FIGS. 3 and 4, the aircraft nacelle 24 includes a thrust reverser 50 configured to redirect the bypass airflow 38, and disposed aft of the OGVs 44, the fan case 42 and a stationary fan cowl 52 spaced radially outward from the fan case 42. The thrust reverser 50 may include an outer fixed structure (OFS) 54, a translating sleeve 56 (also see FIG. 1), a blocker door assembly 58 and a cascade assembly 60 (also see FIG. 1). The outer fan cowl 52 is spaced radially outward from the OFS 54 and may be axially aligned thereto, such that the OFS 54 on one side, and the outer fan cowl 52 and/or an outer cowl 70 on the other side may define, at least in-part, the boundaries of a cavity 62. The cavity 62 may be substantially annular and is open in a rearward or aft direction.

The fan case 42 may be substantially aligned axially to and located radially inward from the OFS 54. The OFS 54 may include a V-flange that engages a V-groove on the fan case 42, or vice et versa. The OFS 54 may further include a shear web 55 that generally projects axially rearward from the fan case 42. The shear web 55 is spaced radially outward from the core cowl 26. The fan case 42 and the core cowl 26 define the boundaries of a portion of the bypass duct 34. Together, the fan case 42, the OFS 54 and the shear web 55 are a fixed structure with respect to the translating cascade assembly 60. It is further contemplated and understood that the OFS 54 may be an integral part of the fan case 42, such that the fan case 42 defines in-part the annular cavity 62. Alternatively, the OFS 54 as part of the thrust reverser 50 may generally fit within the cavity 62, and the fan case 42 defines in-part the cavity 62. It is also contemplated and understood that other blocker door configurations may be utilized as part of the present disclosure with and without the use of drag links 74.

During thrust reverser 50 deployment, the translating sleeve 56 is configured to move from a forward position 64 (see FIG. 3), through a mid-position (not shown), and to a rearward or aft position 66 (see FIG. 4). During thrust reverser 50 stowing operation, the translating sleeve 56 is configured to move from the aft position 66, through the mid-position (not shown), and to the forward position 64. The translating sleeve 56 may include an inner panel 68 and an outer cowl 70 that may be substantially axially aligned to and spaced radially outward from the inner panel 68 (i.e., pressure plate or shelf). The inner panel 68 is spaced radially outward from the core cowl 26 with a portion of the bypass duct 34 being defined therebetween.

Referring to FIGS. 3 and 4, the blocker door assembly 58 is configured to deploy and thereby redirect the bypass airflow 38 from continuing through the bypass duct 34 to the fan nozzle assembly 46 when the translating sleeve 56 is in the aft position 66. The blocker door assembly 58 includes a plurality of blocker doors 72 circumferentially distributed about the centerline C, and may include at least one drag link 74 for each blocker door 72. Each blocker door 72 may be pivotally engaged to the inner panel 68 of the translating sleeve 56. Each drag link 74 may be pivotally engaged and extends between the core cowl 26 and a distal end 76 of the blocker doors 72. In operation, as the translating sleeve 56 moves from the forward position 64 and toward the aft position 66, each blocker door 72 pivots away from the inner panel 68 and into the bypass duct 34 as urged by the drag link 74. When the translating sleeve 56 is in the full aft position 66, the blocker doors 72 are fully deployed and a majority of the bypass airflow 38 is diverted through the cascade assembly 60.

The cascade assembly 60 is constructed and arranged to be in a stowed state 78 (see FIG. 3) when the translating sleeve 56 is in the forward position 64, and in a deployed state 80 (i.e., for diverting the bypass airflow 38, see FIG. 4) when the translating sleeve 56 is in the aft position 66. The cascade assembly 60 may include a cascade 82 (also see FIG. 1) (i.e., cascade array), a forward hook device 84 (see FIG. 4), a deflection limiter 85 (see FIG. 4) that may be aft of the forward hook device 84, and the shear web 55. The cascade 82 may include a plurality of cascade segments mounted in a radial pattern about the centerline C, and may be a translating cascade configured to move between the stowed and deployed states 78, 80. The cascade assembly 60 may be part of a lost motion device in the sense that the cascade 82 moves at an axial distance that is less than the axial movement of the translating sleeve 56 as the cascade assembly 60 moves between the stowed and deployed states 78, 80.

In operation, when the cascade assembly 60 is in the stowed state 78, the cascade 82 is generally located in the cavity 62. When the cascade assembly 60 is in the deployed state 80, the cascade 82 is externally exposed (i.e., axially) between the outer cowls 52, 70, and the bypass airflow 38 is diverted substantially radially outward, through the cascade 82, and through a gap axially defined between opposing edges of the outer cowls 52, 70. Although the cascade 82 may be comprised of individual and circumferentially distributed panels that when assembled form a cascade ring, the entire cascade and/or each individual panel may extend axially forward from the translating sleeve 56 as one-piece. That is, during operation of the cascade assembly 60 between the stowed and deployed states 78, 80, the cascade 82 may not divide into two separate portions or otherwise reshape itself. It is further contemplated and understood that the cascade 82 may be divided into multiple configurations.

The forward hook device 84 (see FIG. 4) may include a fixed or stationary catch or hook 86 that may be engaged to the stationary shear web 55 and a translating catch 88 that may be engaged to a forward portion or distal end 90 of the cascade 82. In operation, when the translating sleeve 56 is in the forward position 64, the translating catch 88 is spaced axially forward of the fixed catch 86. When the translating sleeve 56 is in the aft position 66 the catches 86, 88 are mated primarily to transfer load, and to some degree limit deflection.

Referring to FIGS. 3, 4, 9 and 10, the deflection limiter 85 may include a first catch 130 that may be attached to, and projects radially inward from, a forward portion 132 of the outer cowl 70 of the translating sleeve 56. A second catch 134 of the deflection limiter 85 may be attached to, and may project radially outward from, an aft portion 136 of the cascade 82. In operation, when the translating sleeve 56 is in the forward position 64, the first catch 130 is spaced axially forward of the second catch 134. During deployment operations of the thrust reverser and when the translating sleeve 56 moves in an axially rearward direction (see arrow 140 in FIG. 9) to the mid-position, the deflection limiter 85 may become engaged (i.e., mated) to limit deflection. As the translating sleeve continues to move rearward from the mid-position and toward the aft position, the deflection limiter 85 remains mated. Use of the term 'mid-position' does not necessarily mean axially centered between the forward position 64 and the aft position 66. In one embodiment and in terms of total axial displacement between the forward and aft positions 64, 66, about ninety-five percent (95%) of the total axial displacement is located between the forward position 64 and the mid-position, with the remaining five percent (5%) located between the mid-position and the aft position 66.

In another embodiment when moving from the forward position 64 and toward the aft position 66, the translating sleeve 56 and the cascade 82 may begin moving at the same time and at the same rate of speed. The cascade 82 may then stop while the sleeve 56 continues to move rearward. In yet another embodiment, the translating sleeve 56 and the cascade 82 may start moving at the same time but at different rates of speed. Both the sleeve 56 and the cascade 82 may then stop moving at the same time but in different relative positions than when they started to deploy due to the different rates of speed.

It is further contemplated and understood that the aft portion 136 of the cascade 82 may be a cascade hoop extending circumferentially about engine centerline C. As the cascade 82 moves between the stowed and deployed states 78, 80, the cascade hoop 136 may ride axially along axially extending beams or tracks (not shown) spaced circumferentially about the centerline C, and mechanically powered by any variety of actuator configurations (not shown). Similarly, the forward portion 132 of the outer cowl 70 may include a cowl hoop that may structurally reinforce the outer cowl 70.

Referring to FIG. 5, when the cascade assembly 60 is in the deployed state 80, axial load (see arrows 92) may be imposed by the airflow 38 passing through the cascade 82. The cascades 82 may pass the axial load 92 forward to the hook 86 of the shear web 55 that passes it forward to a V-blade 94 that transfers the load to a V-groove 96 that may be carried by the fan case 42. This direct load path may limit axial deflections. Also when the cascade assembly 60 is in the deployed state 80, radial load (see arrows 98) may be imposed by the airflow 38 passing through the cascade 82. The cascade 82 passes load 98 to attachments at the front and aft end of the cascades in a hoop-wise direction to sliders at diametrically opposite beams (not shown) of the nacelle 24.

Referring to FIGS. 5 through 8, the forward hook device 84 may further include a resiliently compliant member 100 that facilitates contact between the fixed half of the hook 86, attached to the shear web 55, and the translating half of the catch 88, attached to the cascades 82 (see FIG. 5), for load transfer when the cascade assembly is in the deployed state 80 (see FIG. 4). The fixed catch 86 may include a first portion 102 projecting radially outward from a rearward end of the shear web 55 and a second portion 104 projecting axially forward from the first portion 102. The first and second portions 102, 104 and the shear web 55 may define a channel 106 (see FIG. 6) opened in an axially forward direction (see arrow 108 in FIG. 6). The resiliently compliant member 100 may be located in the channel 106 and may be engaged to the first portion 102 of the fixed catch 86.

Figure 8:
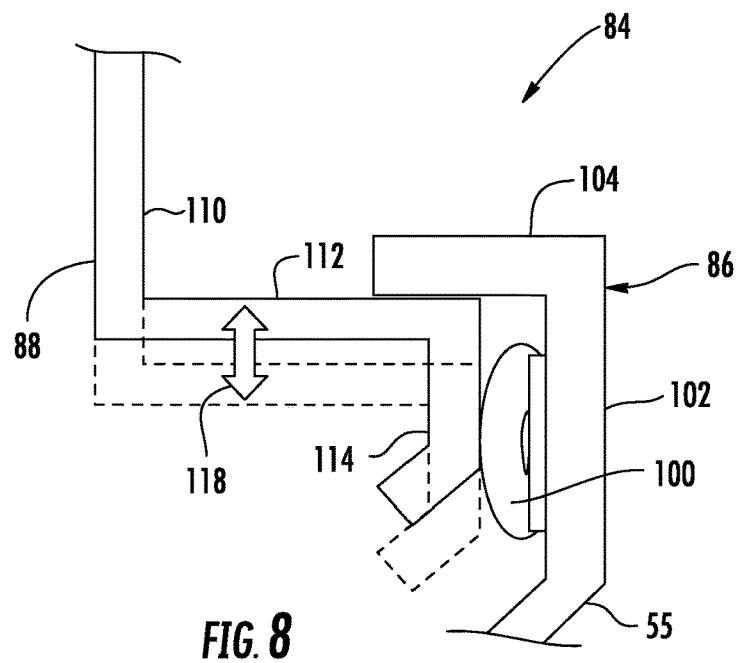
FIG. 8 is a partial cross section of the forward hook device in the deployed state when fully loaded.

Referring to FIGS. 6 through 8, the translating catch 88 of the forward hook device 84 may include a first segment 110 that may project radially inward from the cascade 82 (see FIG. 5), a second segment 112 projecting axially aft of the first segment 110, and a third segment 114 projecting radially inward from the second segment 112 such that the third segment 114 is disposed in the channel 106 when the cascade assembly 60 is in the deployed state 80 (see FIG. 5).

In operation, when the cascade assembly 60 is in the stowed state 78 (see FIG. 3), the third segment 114 of the translating catch 88 is not in the channel 106. When the cascade assembly 60 is in the deployed state 80, the third segment 114 of the translating catch 88 is disposed in the channel 106 and may be biased against the compliant member 100 for the transmission of loads. Referring to FIGS. 7 and 8, a radial gap (see arrow 116 in FIG. 7) may be measured between the second portion 104 of the fixed catch 86 and the second segment 112 of the translating catch 88. Gap 116 may be necessary to allow for tolerances, and may facilitate a limited degree of deflection (see arrows 118 in FIG. 8) during operation of the thrust reverser before radial loads are carried through the forward hook device 84.

Figure 9:
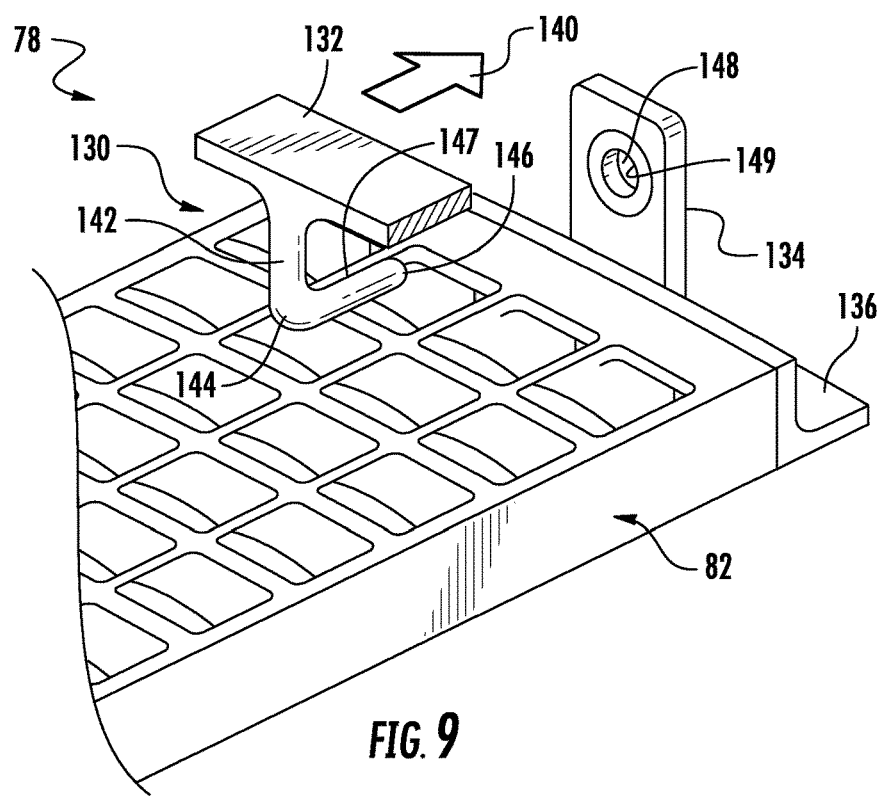
FIG. 9 is a perspective view of an unmated deflection limiter of the cascade assembly.
Figure 10:
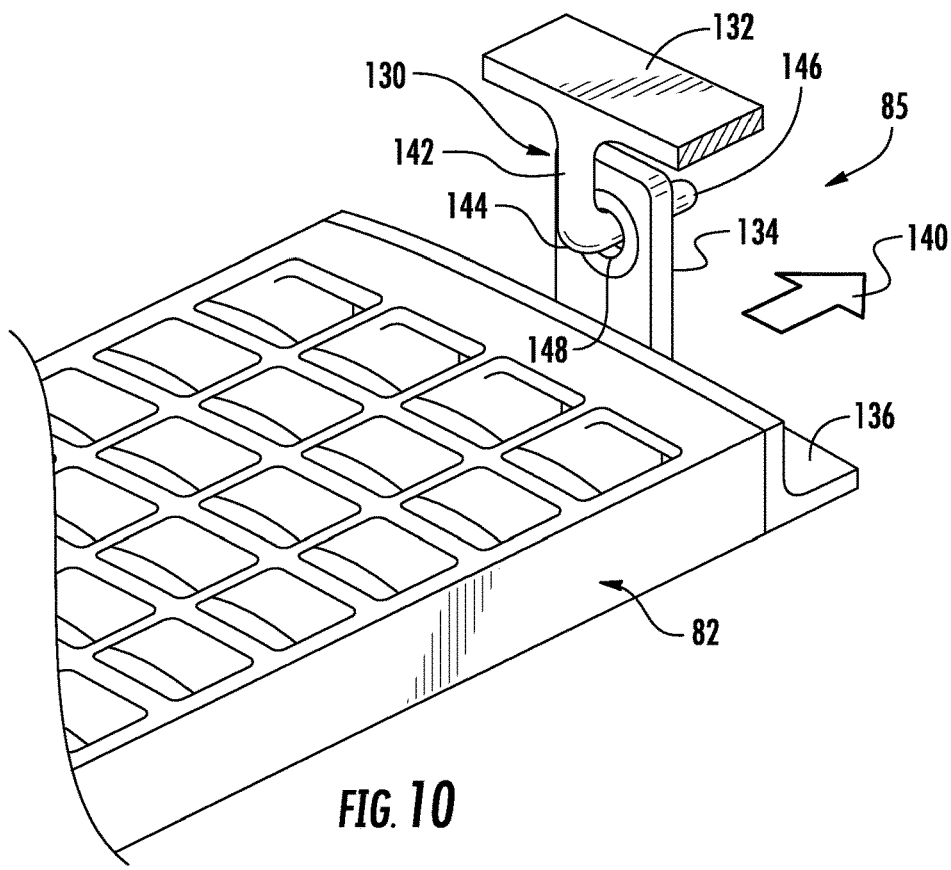
FIG. 10 is a perspective view of the deflection limiter being mated.

Referring to FIGS. 9 and 10, the cascade 82 is illustrated moving from the stowed state 78, in an axial rearward direction (see arrow 140), and toward the deployed state 80 (see FIG. 4). As illustrated in FIG. 10, the deflection limiter 85 is mated when the outer cowl 70 (not shown) of the translating sleeve 56 (see FIG. 4) initially reaches a mid-deployment position, and remains mated as the cascade 82 continues movement in the rearward direction 140 and toward the deployed state 82 (see FIG. 4) to, for example, primarily limit deflection and to some degree transfer load.

The cowl catch 130 of the deflection limiter 85 may include a first portion 142 that projects radially inward from the forward portion 132 of the outer cowl 70 and to a distal edge or end 144. A second portion 146 of the cowl catch 130 may project in the rearward direction 140 from the distal end 144, and may include a surface 147 that faces at least in-part radially outward. The cascade catch 134 may generally project radially outward from the aft portion 136 of the cascade 82, and includes a surface 149 that may define a hole 148. The hole 148 communicates axially for receipt of the second portion 146 of the cowl catch 130. When the deflection limiter 85 is mated, the surface 147 of the second portion 146 of the cowl catch 130 opposes at least a portion of the surface 149 that defines the hole 148. When the opposing surfaces 147, 149 are in contact with one-another, at least radial deflection is limited. It is further contemplated and understood that the first portion 142 of the cowl catch 130 may be circumferentially continuous (i.e., hoop-like) and the second portion 146, which may have a pin-like shape, may be a plurality of second portions spaced circumferentially about the centerline C and each being detachably engaged to respective second portions 146 when mated. Alternatively, the first portion 142 may be a plurality of portions each associated with a respective second portion 146.

In operation, when the cascade assembly 60 is in the stowed state 78, the pin-like second portion 146 of the cowl catch 130 is not in the hole 148. When the cascade assembly 60 is not in the stowed state 78 and when the translating sleeve is in and/or moving from a mid-deployment position and toward the aft position 66 (see FIG. 4), the second portion 146 of the cowl catch 130 is disposed in the hole 148 (i.e., received by the cascade catch 134. This mated connection may generally be solid or loose depending on physical constraints and designed load paths. It is further contemplated that the location of the deflection limiter 85 may be below the cascade 82, where the cowl catch 130 is attached to the inner panel 68, depending upon packaging constraints. Any loads that may be carried through the deflection limiter 85 may be radial, racking or forward/aft loads depending on the design and physical constraints.

Figure 11:
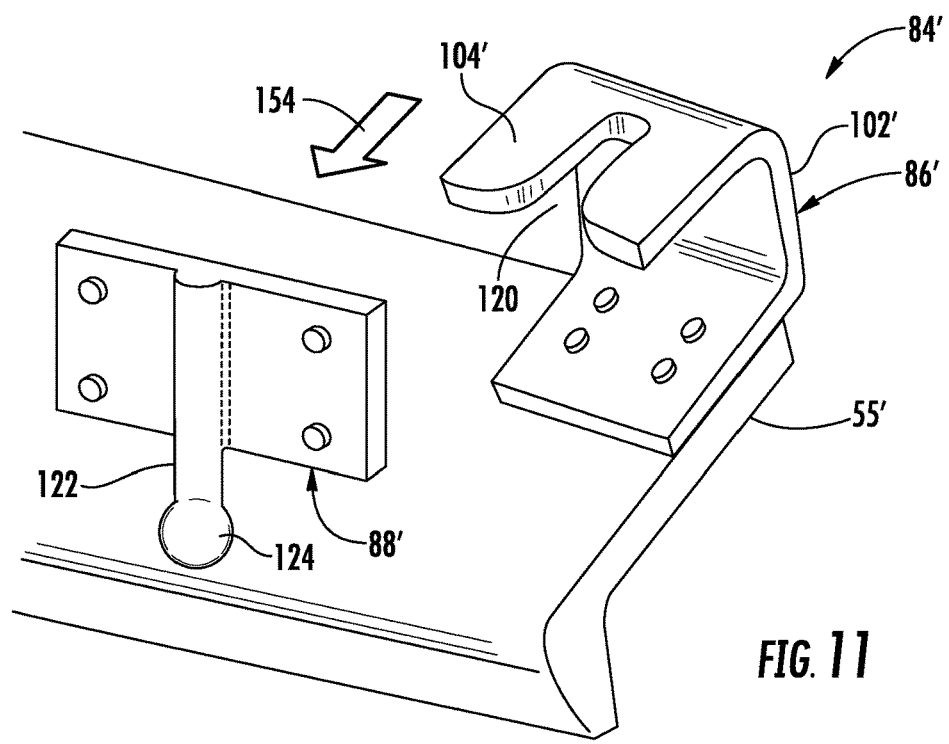
FIG. 11 is a partial perspective view of a second embodiment of a forward hook device.

Referring to FIG. 11, a second embodiment of a forward hook device is illustrated wherein like elements have like identifying numerals except with the addition of a prime suffix. A forward hook device 84' includes a fixed catch 86' and a translating catch 88'. The fixed catch 86' includes a first portion 102' projecting radially outward from a rearward end of a shear web 55' and a second portion 104' projecting axially forward from the first portion 102'. A slot 120 in the second portion 104' may be opened in a forward direction (see arrow 154) for receipt of the translating catch 88'.

The translating catch 88' may include a neck 122 projecting radially inward from a cascade (not shown) and an enlarged head 124 generally disposed at a distal end of the neck 122. When the cascade assembly is in the deployed state, the neck 122 is in the slot 120. Because the enlarged head 124 is generally larger than a width of the slot 120, the second portion 104' generally captures the enlarged head 124 thus mating the hook device 84'.

Figure 12:
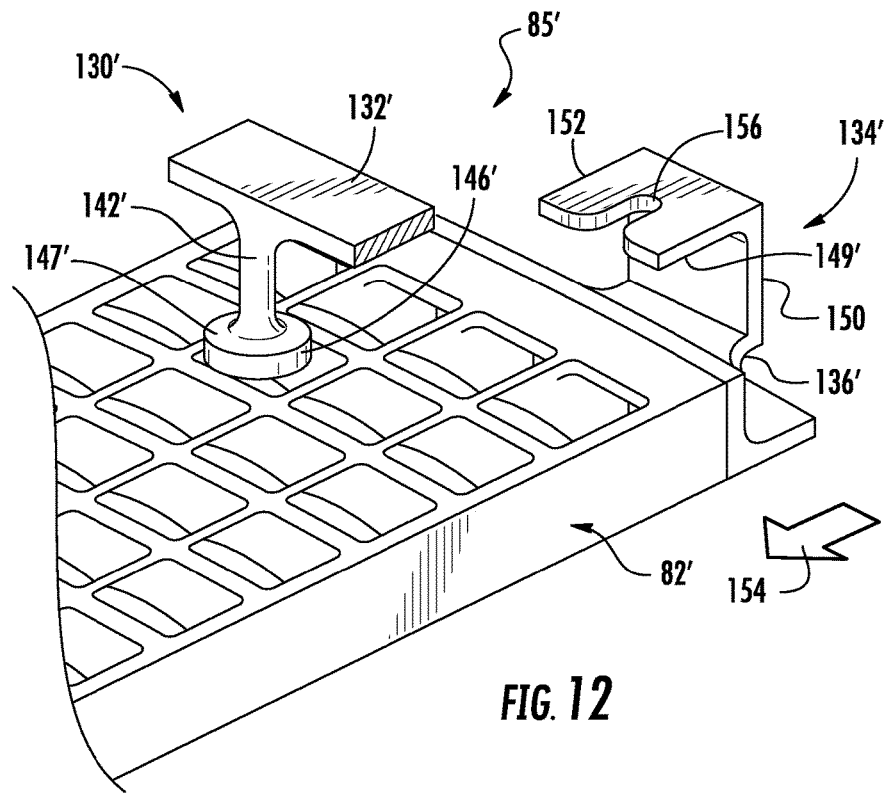
FIG. 12 is a perspective view of a second embodiment of a deflection limiter.

Referring to FIG. 12, a second embodiment of a deflection limiter is illustrated wherein like elements have like identifying numerals except with the addition of a prime suffix. A cowl catch 130' of a deflection limiter 85' includes a first portion or neck 142' projecting radially inward from a forward edge or hoop 132' of an outer cowl. Fixed rigidly to a distal end of the first portion 142' may be an enlarged head 146' of the catch 130'. A cascade catch 134' of the deflection limiter 85' may include a first segment 150 projecting radially outward from an aft portion or cascade hoop 136' of a translating cascade 82', and second segment 152 projecting in an axial forward direction 154 and spaced radially outward from the translating cascade 82'. A slot 156 may be defined by the second segment 152 and is open in the forward direction 154 for receipt of the first portion 142' such that the enlarged head 146' is located radially between the cascade 82' and the second segment 152 when the deflection limiter 85' is mated. It is further contemplated and understood that the deflection limiter 85' may be a plurality of deflection limiters spaced circumferentially about an engine centerline C. It is further contemplated that various parts of the deflection limiter(s) 85' may be discrete or circumferentially continuous about the engine centerline C.

Figure 13:
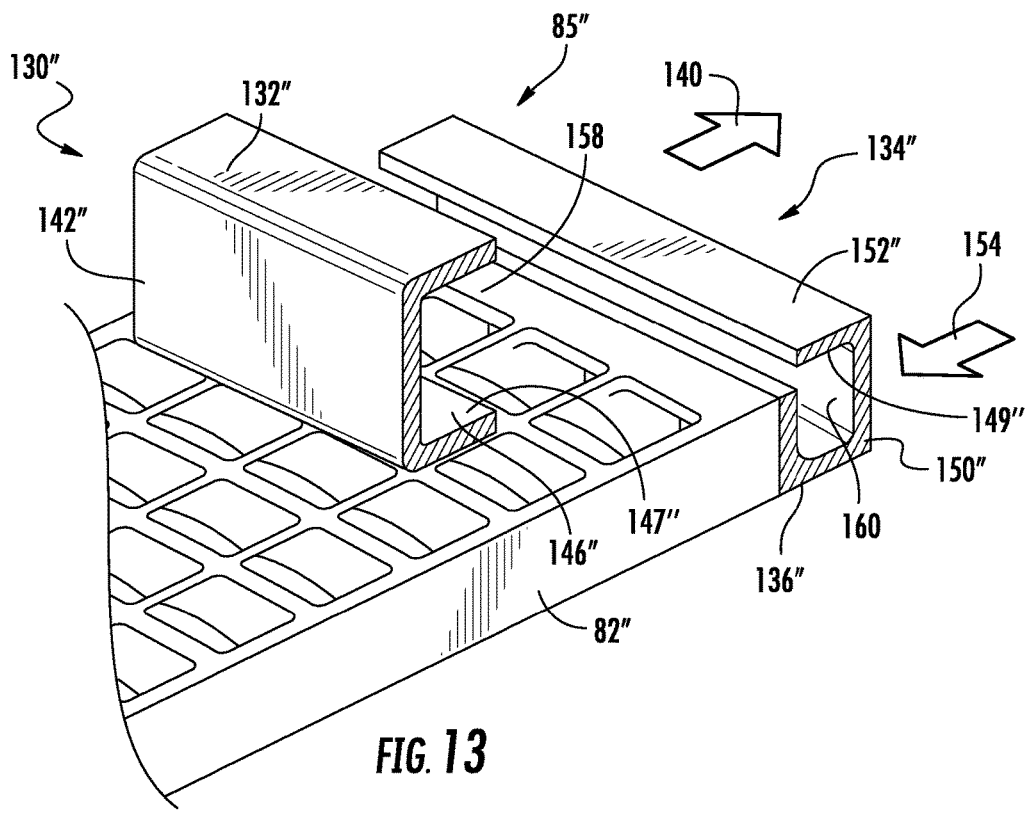
FIG. 13 is a perspective view of a third embodiment of a deflection limiter.

Referring to FIG. 13, a third embodiment of a deflection limiter is illustrated wherein like elements have like identifying numerals except with the addition of a double prime suffix. A deflection limiter 85" includes a cowl catch 130" and a cascade catch 134". The cowl catch 130" may include a first portion 142" projecting radially inward from a forward edge or hoop 132" of an outer cowl and to a distal end. Projecting axially rearward from the distal end may be a second portion 146". Together, the hoop 132", the first portion 142", and the second portion 146" may define the boundaries of a circumferentially extending groove 158 opened in a rearward direction 140. A cascade catch 134" of the deflection limiter 85" may include a first segment 150" projecting radially outward from an aft portion or cascade hoop 136" of a translating cascade 82", and second segment 152" projecting in an axial forward direction 154 and spaced radially outward from the translating cascade 82". Together, the aft portion 136", the first segment 150" and the second segment 152" may define the boundaries of a circumferentially extending groove 160 opened in the forward direction 154.

The groove 160 may be constructed and arranged to receive the second portion 146" of the cowl catch 130" when the deflection limiter 85" is mated. Similarly, the groove 160 may be constructed and arranged to receive the second segment 152" of the cascade catch 134" when the deflection limiter 85" is mated. It is further contemplated and understood that the deflection limiter 85" may be a plurality of deflection limiters spaced circumferentially about an engine centerline C. It is further contemplated the deflection limiter 85" may be circumferentially continuous about the engine centerline C.

Figure 14:
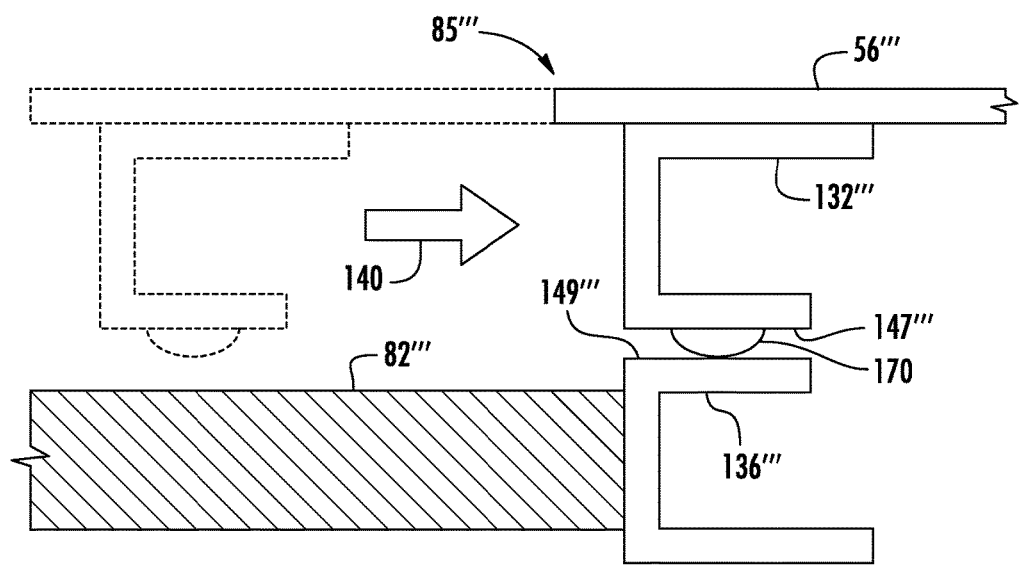
FIG. 14 is a cross section view of a fourth embodiment of a deflection limiter.

Referring to FIG. 14, a fourth embodiment of a deflection limiter is illustrated wherein like elements have like identifying numerals except with the addition of a triple prime suffix. A deflection limiter 85''' includes a first surface 147''' that may face substantially radially inward and may be carried by a hoop 132''' fixed to the translating sleeve 56'''. A second surface 149''' of the deflection limiter 85''' may face substantially radially outward and may be carried by a hoop 136''' of the cascade 82". When the deflection limiter 85''' is unmated, the first surface 147''' may be spaced axially forward of the second surface 149'''. When the deflection limiter 85''' is mated, the first and second surfaces 147''', 149''' may radially oppose one-another. A compliant member 170 of the deflection limiter 85''' may be attached to one of the surfaces 147''', 149''' and may be resiliently compressed between the surfaces when the deflection limiter 85''' is mated, thereby limiting deflection that may be substantially radial. It is further contemplated and understood, that the surfaces 147''', 149''' may be generally carried directly by the respective translating sleeve 56''' and cascade 82''' or any fixed structures projecting therefrom. It is further understood that the surface 147''' may face radially outward and the surface 149''' may face radially inward depending upon the orientation of the structure(s) that carry the surfaces.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

I claim:

1. A cascade assembly of a nacelle for a turbofan engine comprising:
   a cascade centered to and extending about a centerline;
   a translating sleeve constructed and arranged to move between a forward position and an aft position along the centerline; and
   a deflection limiter including a first surface facing at least in-part in a radial direction and carried by one of the cascade and the translating sleeve and a second surface facing at least in-part in an opposite radial direction and carried by the other of the cascade and the translating sleeve, and wherein the first and second surfaces oppose one-another for limiting deflection when the translating sleeve is in the aft position and are spaced axially apart when the translating sleeve is in the forward position;
   wherein the cascade is a translating cascade constructed and arranged to move between a stowed state and a deployed state along the centerline, and wherein the deflection limiter is mated for transferring load when the translating sleeve is in the aft position and the translating cascade is in the deployed state, and is un-mated when the translating sleeve is in the forward position and the translating cascade is in the stowed state;
   wherein the first surface is carried by a first catch of the deflection limiter fixed to the translating sleeve and the second surface is carried by a second catch of the deflection limiter fixed to the cascade, and wherein the first and second catches are constructed and arranged to mate when the translating sleeve is in the aft position and is un-mated when the translating sleeve is in the forward position; and
   a fixed structure;
   a hook device including a third catch fixed to the fixed structure and a fourth catch fixed to a forward portion of the cascade, and wherein the third catch is mated to the fourth catch for translating load when the translating cascade is in the deployed state and the translating sleeve is in the aft position; and
   wherein the second surface is carried by an aft portion of the cascade disposed axially rearward of the forward portion.

2. The cascade assembly set forth in claim 1, wherein the translating cascade is a one-piece cascade.

3. The cascade assembly set forth in claim 1, wherein the aft portion is a cascade hoop.

4. The cascade assembly set forth in claim 1, wherein the fixed structure includes a fan case.

5. The cascade assembly set forth in claim 1, wherein the first catch is axially spaced forward of the second catch when the translating sleeve is in the forward position, and wherein during deployment the first catch is mated to the second catch when the translating sleeve is moving from a mid-position to the aft position.

6. A cascade assembly of a nacelle for a turbofan engine comprising:
   a cascade centered to and extending about a centerline;
   a translating sleeve constructed and arranged to move between a forward position and an aft position along the centerline; and
   a deflection limiter including a first surface facing at least in-part in a radial direction and carried by one of the cascade and the translating sleeve and a second surface facing at least in-part in an opposite radial direction and carried by the other of the cascade and the translating sleeve, and wherein the first and second surfaces oppose one-another for limiting deflection when the translating sleeve is in the aft position and are spaced axially apart when the translating sleeve is in the forward position;
   wherein the cascade is a translating cascade constructed and arranged to move between a stowed state and a deployed state along the centerline, and wherein the deflection limiter is mated for transferring load when the translating sleeve is in the aft position and the translating cascade is in the deployed state, and is un-mated when the translating sleeve is in the forward position and the translating cascade is in the stowed state;

wherein the first surface is carried by a first catch of the deflection limiter fixed to the translating sleeve and the second surface is carried by a second catch of the deflection limiter fixed to the cascade, and wherein the first and second catches are constructed and arranged to mate when the translating sleeve is in the aft position and is un-mated when the translating sleeve is in the forward position;

wherein the cascade includes a forward portion and an aft portion located axially rearward of the forward portion and the second catch is fixed to the aft portion;

wherein the first catch is axially spaced forward of the second catch when the translating sleeve is in the forward position, and wherein during deployment the first catch is mated to the second catch when the translating sleeve is moving from a mid-position to the aft position; and wherein the first catch includes a first portion projecting radially inward from the translating sleeve and at a pin-like second portion projecting axially rearward from the first portion, and wherein the second catch includes a first segment projecting radially outward from the aft portion of the translating cascade and defining a hole for receipt of the pin-like second portion when the deflection limiter is mated.

7. The cascade assembly set forth in claim 1, wherein the third catch includes a first portion projecting radially outward from the fixed structure and a second portion projecting axially forward from the first portion, the first and second portions defining at least in-part a channel, and wherein the fourth catch includes a first segment projecting radially inward from the translating cascade and a second segment projecting axially aft of the first segment such that the second segment is disposed in the channel when the translating cascade is in the deployed state.

8. The cascade assembly set forth in claim 7, wherein the fixed structure includes a shear web projecting at least in-part axially rearward and the first portion of the third catch is attached to the shear web.

9. The cascade assembly set forth in claim 1, wherein the fixed structure includes a shear web projecting at least in-part axially rearward and the third catch is attached to the shear web.

* * * * *